(12) United States Patent
Park

(10) Patent No.: US 12,051,004 B2
(45) Date of Patent: Jul. 30, 2024

(54) NEURAL ARCHITECTURE SEARCH METHOD BASED ON KNOWLEDGE DISTILLATION

(71) Applicant: AIMATICS CO., LTD., Seoul (KR)

(72) Inventor: Kwan Woo Park, Seoul (KR)

(73) Assignee: AIMATICS CO., LTD., Seoul (KR)

( * ) Notice: Subject to any disclaimer, the term of this patent is extended or adjusted under 35 U.S.C. 154(b) by 740 days.

(21) Appl. No.: 17/323,399

(22) Filed: May 18, 2021

(65) Prior Publication Data

US 2022/0156596 A1 May 19, 2022

(30) Foreign Application Priority Data

Nov. 17, 2020 (KR) ........................ 10-2020-0153814

(51) Int. Cl.
*G06N 3/088* (2023.01)
*G06N 3/04* (2023.01)
*G06N 3/045* (2023.01)

(52) U.S. Cl.
CPC ............. *G06N 3/088* (2013.01); *G06N 3/045* (2023.01)

(58) Field of Classification Search
CPC ........ G06N 3/008; G06N 3/0455; G06N 3/02; G06N 3/04; G06N 3/0464; G06N 3/0475; G06N 3/0495; G06N 3/0499; G06N 3/08; G06N 3/096; G06N 20/00
See application file for complete search history.

(56) References Cited

U.S. PATENT DOCUMENTS

| 2021/0265018 A1* | 8/2021 | Dutta | G06N 3/048 |
| 2022/0094713 A1* | 3/2022 | Lee | G06F 18/214 |
| 2022/0156596 A1* | 5/2022 | Park | G06N 3/045 |
| 2022/0344049 A1* | 10/2022 | Hall | G06N 3/0464 |

FOREIGN PATENT DOCUMENTS

| CN | 110059740 A | * | 7/2019 | |
| CN | 112115783 B | * | 11/2023 | ........... G06F 18/214 |
| KR | 10-2018-0127171 A | | 11/2018 | |
| KR | 10-2100973 B1 | | 4/2020 | |
| KR | 10-2020-0045128 A | | 5/2020 | |
| WO | WO-2021056043 A1 | * | 4/2021 | ........... G06F 9/5033 |

* cited by examiner

*Primary Examiner* — Paulinho E Smith
(74) *Attorney, Agent, or Firm* — You & IP, LLC

(57) ABSTRACT

Provided is a neural architecture search method based on knowledge distillation, which trains a student network using knowledge acquired from a teacher network and searches a target neural network. The neural architecture search method may include the steps of: (a) extracting an image feature map from a learning model of the student network; (b) calculating a loss function by comparing an image feature map extracted from a learning model of the teacher network to the image feature map extracted in the step (a); (c) selecting a block whose capacity is to be increased and a block whose capacity is to be decreased, for each learning model block of the student network, based on the loss function; and (d) deciding a candidate learning model of the student network according to the block architecture selected in the step (c).

12 Claims, 6 Drawing Sheets

NEURAL ARCHITECTURE SEARCH METHOD BASED ON KNOWLEDGE DISTILLATION

BACKGROUND

1. Technical Field

The present disclosure relates to a neural architecture search method, and more particularly, to a neural architecture search method based on knowledge distillation, which can train a student network and search a target neural network, by utilizing knowledge acquired from a teacher network based on knowledge distillation.

2. Related Art

In general, an artificial neural network refers to a network which is configured by modeling the characteristics of biological neural cells of a human being through a mathematical expression, and utilized in the machine learning or deep learning field. The artificial neural network can present the direction to accomplish a target learning effect for an input pattern which has never been learned, by using learning results which have been acquired through innumerable learning processes. The existing learning results may have an effect of reducing the amount of calculation for new learning and the number of parameters used for the calculation.

Knowledge distillation refers to a method for training a student network by utilizing knowledge acquired through a teacher network. The student network may imitate the teacher network which had been trained in advance, thereby improving the performance of a learning model even with a relatively small number of parameters. For example, a neural architecture search method based on knowledge distillation may be used for a process of recognizing an image taken by a camera in an autonomous vehicle and extracting main objects from the image.

Korean Patent No, 10-2100973 entitled "Machine Learning System using Joint Learning and Method thereof" suggests a method for jointly training a teacher-learning model and a student-learning model. According to this prior art document, the machine learning system extracts the features of input data from a sharing engine, and jointly trains a teacher-learning model and a student-learning model to minimize errors and characteristic differences between the teacher-learning model and the student-learning model, which have diverged from the sharing engine. In this document, however, the reliability of the teacher-learning model may be degraded. Thus, the reliability of a value obtained by calculating a loss between the two learning models may also be degraded.

Korean Patent Application Laid-Open No, 10-2018-0127171 entitled "Apparatus and Method for Student-Teacher Transfer Learning Network using Knowledge Bridge" suggests a method which connects knowledge bridges of a teacher network and a student network, such that each of the knowledge bridges provides a hint for a loss function. In this document, however, when a hint of the teacher network for an inquiry of the student network is not correct, a huge error is highly likely to occur in calculating the loss function.

Korean Patent Application Laid-Open No. 10-2020-0045128 entitled "Model Training Method and Apparatus, and Data Recognizing Method" suggests a method that decides a loss function by reflecting the error rate between a recognition result of a teacher model and a recognition result of a student model into the loss function, and trains the student model based on the loss function. In this document, the model training method and apparatus may decide the loss function such that the higher the error rate between the recognition result of the teacher model and the recognition result of the student model, the larger the contribution ratio of the teacher model to the student model, in order to solve the problems of the second document. However, a reference used for calculating the error rate between the teacher model and the student model is not clear.

Above all things, the knowledge distillation methods according to the related arts are focused on reducing the size of the artificial neural network. Thus, the capacity of the student network is set to a smaller capacity than that of the teacher network. Also, the capacity of the student network is not changed.

RELATED ART DOCUMENT

Patent Document

Korean Patent No. 10-2100973
Korean Patent Application Laid-Open No. 10-2018-0127171
Korean Patent Application Laid-Open No. 10-2020-0045128

SUMMARY

Various embodiments are directed to a neural architecture search method based on knowledge distillation, which is applied to image recognition technology, and can calculate a loss function based on the distance and direction between a feature map of a learning model extracted from a teacher network and a feature map of a learning model extracted from a student network, decide a block whose capacity is to be increased and a block whose capacity is to be decreased, among blocks of the student network, based on the calculated loss function, generate a final learning model of the student network through a selected architecture, such that the student network can exhibit performance close to the teacher network.

In an embodiment, there is provided a neural architecture search method based on knowledge distillation, which is performed by a model training device that is mounted in an autonomous vehicle and configured to recognize and learn an image or a data recognition device that is installed in a server and configured to recognize and learn image data received from the outside, and trains a student network using knowledge acquired from a teacher network and searches a target neural network, wherein the model training device and the data recognition device each include a communication unit; a memory; and a processor. The neural architecture search method may include the steps performed by the processor of: (a) extracting an image feature map from a learning model of the student network; (b) calculating a loss function by comparing an image feature map extracted from a learning model of the teacher network to the image feature map extracted in the step (a), updating a learning model of the student network until the number of learning processes in the student network reaches the predetermined maximum number of learning processes based on knowledge distillation, and calculating a block implementation rate by performing a hyperbolic tangent operation on a cumulative loss function for each block of the learning model of the student network; (c) selecting a block whose capacity is to be increased and a block whose capacity is to be decreased, for each learning model block of the student network, wherein a block whose block implementation rate is smaller than a reference value is increased, and a block whose block implementation rate is larger than the reference value is decreased; and (d) deciding a candidate learning model of the student network according to the block architecture selected in the step (c).

In an aspect of the present disclosure, the loss function of the step (b) comprises a first loss function obtained by comparing a loss caused by a distance difference between at least two feature points within the image feature map of the teacher-learning model to a loss caused by a distance difference between at least two feature points within the image feature map of the student-learning model.

In an aspect of the present disclosure, the loss function of the step (b) comprises a second loss function obtained by comparing a loss caused by direction differences between at least three feature points within the image feature map of the teacher-learning model to a loss caused by a direction differences between at least three feature points within the image feature map of the student-learning model.

In an aspect of the present disclosure, the loss function of the step (b) comprises the sum of a first loss function obtained by comparing a loss caused by a distance difference between at least two feature points within the image feature map of the teacher-learning model to a loss caused by a distance difference between at least two feature points within the image feature map of the student-learning model and a second loss function obtained by comparing a loss caused by direction differences between at least three feature points within the image feature map of the teacher-learning model to a loss caused by a direction differences between at least three feature points within the image feature map of the student-learning model.

In an aspect of the present disclosure, the capacity of the step (c) comprises at least any one of the kernel size, the number of layers and the number of kernels in each of the blocks of the learning model of the student network.

In an aspect of the present disclosure, the neural architecture search method further comprises the step (e) of verifying the candidate learning model of the student network, selected in the step (d).

In an aspect of the present disclosure, the step (e) comprises: (e-1) extracting an image feature map from the candidate learning model, (e-2) calculating a verification loss function by comparing the image feature map extracted from the learning model of the teacher network to the image feature map of the candidate learning model extracted in the step (e-1); and (e-3) selecting, as a final learning model, a learning model having the smallest verification loss function, among the candidate learning models.

In an aspect of the present disclosure, the verification loss function of the step (e-2) comprises a third loss function obtained by comparing a loss caused by a distance difference between at least two feature points within the image feature map of the teacher-learning model to a loss caused by a distance difference between at least two feature points within the image feature map of the candidate learning model.

In an aspect of the present disclosure, the verification loss function of the step (e-2) comprises a fourth loss function obtained by comparing a loss caused by direction differences between at least three feature points within the image feature map of the teacher-learning model to a loss caused by direction differences between at least three feature points within the image feature map of the candidate learning model.

In an aspect of the present disclosure, the verification loss function of the step (e-2) comprises the sum of a third loss function obtained by comparing a loss caused by a distance difference between at least two feature points within the image feature map of the teacher-learning model to a loss caused by a distance difference between at least two feature points within the image feature map of the candidate learning model and a fourth loss function obtained by comparing a loss caused by direction differences between at least three feature points within the image feature map of the teacher-learning model to a loss caused by direction differences between at least three feature points within the image feature map of the candidate learning model.

In an aspect of the present disclosure, the verification loss function of the step (e-2) is repeatedly updated until the number of learning processes in the student network reaches the predetermined maximum number of verification learning processes based on knowledge distillation.

In an aspect of the present disclosure, the neural architecture search method further comprises the step of determining whether a neural architecture search count reaches the maximum count, after the step (e-3), wherein (i) when the neural architecture search count does not reach the maximum count, the neural architecture search count is increased, and the procedure returns to the step (a), and (ii) when the neural architecture search count has reached the maximum count, the neural architecture search is ended.

In accordance with the embodiment of the present disclosure, the neural architecture search method based on knowledge distillation can calculate a loss function based on the distance and direction between a feature map of a learning model extracted from the teacher network and a feature map of a learning model extracted from the student network, decide a block whose capacity is to be increased and a block whose capacity is to be decreased, among the blocks of the student network, based on the calculated loss function, generate a final learning model of the student network through a selected architecture, such that the student network can exhibit performance close to the teacher network.

DETAILED DESCRIPTION

Figure 1:
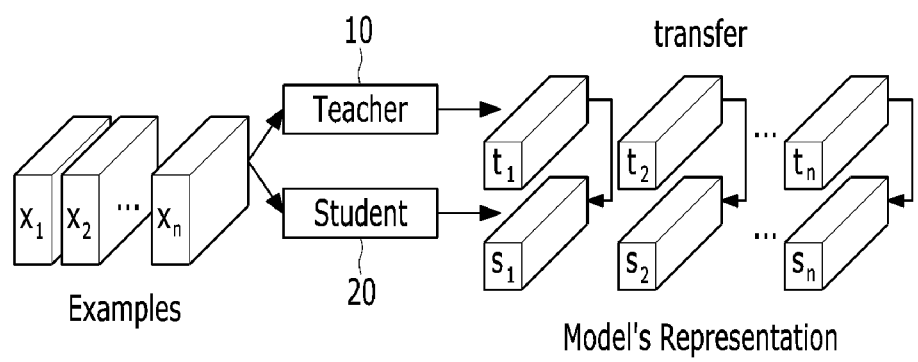
FIG. 1 is a block diagram illustrating learning models of a general teacher-student network based on individual knowledge distillation.

Hereafter, exemplary embodiments of the present disclosure will be described with reference to the accompanying drawings. However, the present disclosure is not limited to the exemplary embodiments, but it should be understood that the present disclosure may include all modifications, equivalents and substitutions included in the spirit and technical scope of the present disclosure.

Elements having similar configurations and operations throughout the specification are denoted by the same reference numerals. The accompanying drawings of the present disclosure are for convenience of description and the shapes and relative scales may be exaggerated or omitted.

In describing the embodiments in detail, redundant descriptions or descriptions of technologies that are obvious in the art have been omitted. Furthermore, in the following description, when a part is referred to as "including" another component, it means that the part may further include components in addition to the described component unless otherwise stated.

Furthermore, a term such as " . . . unit", " . . . or (or . . . er)", and " . . . module" described in this specification means a unit for processing at least one function or operation, and this may be implemented with hardware, software, or a combination of the hardware and the software. Furthermore, when a part is referred to as being electrically connected to another part, it may indicate the part is directly connected to the another part or connected to the another part with another configuration interposed therebetween.

Terms including ordinal numbers such as first and second may be used to describe various components, but the components are not limited by the terms. The terms are used only to distinguish one component from another component. For example, a second component may be referred to as a first component and similarly, the first component may also be referred to as the second component without departing from the scope of the present disclosure.

Figure 2:
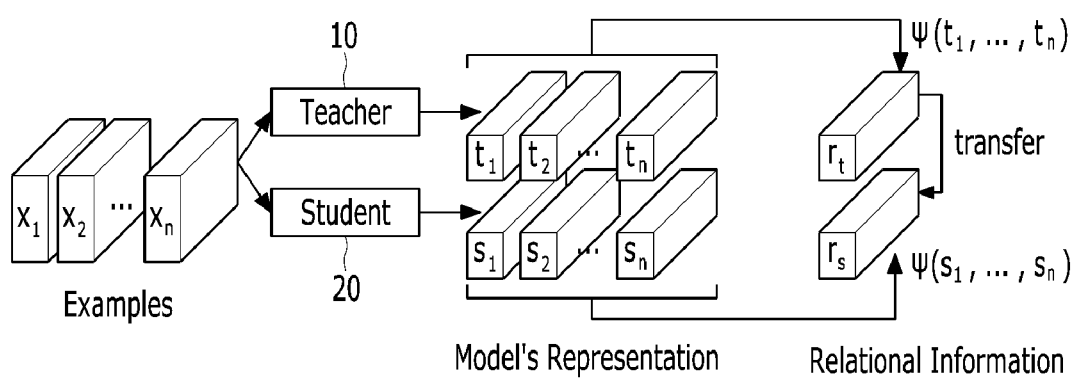
FIG. 2 is a block diagram illustrating learning models of a general teacher-student network based on relational knowledge distillation.

FIG. 1 is a block diagram illustrating learning models of a general teacher-student network based on individual knowledge distillation, and FIG. 2 is a block diagram illustrating learning models of a general teacher-student network based on relational knowledge distillation.

Referring to FIGS. 1 and 2, learning models of a teacher-student network based on knowledge distillation include a teacher network 10 and a student network 20. Each of the networks is configured as a neural network in which artificial neurons are connected through a network.

In the learning model of the teacher-student network based on individual knowledge distillation in FIG. 1, blocks of the teacher network 10 and blocks of the student network 20 are individually matched to transfer knowledge. In the learning model of the teacher-student network based on relational knowledge distillation in FIG. 2, however, blocks of the teacher network 10 are related to one another, and blocks of the student network 20 are related to one another, such that knowledge is transferred to the entire blocks related to one another. Furthermore, a loss function is also decided for the entire blocks. The neural architecture search method based on knowledge distillation in accordance with the embodiment of the present disclosure may be performed without being limited to individual knowledge distillation or relational knowledge distillation.

Typically, the teacher network 10 indicates a network in which similar pre-learning has been already performed or a vast network, and has a larger size than the student network 20. The network having a large size indicates a network having more layers, kernels and nodes or a network configured as a combination thereof.

The student network 20 follows a learning model extracted from the teacher network 10, and has network components which are similar to the teacher network 10 but have a smaller size than the teacher network 10. However, in the neural architecture search method based on knowledge distillation in accordance with the embodiment of the present disclosure, the student network 20 is not set to a fixed size, unlike student networks according to the related arts.

One of the important technical features of the present disclosure is to increase/decrease the capacities of the blocks constituting the student network 20. The present disclosure provides a method that increases the capacity of a block with low performance in the student network 20, and decreases the capacity of a block with high performance in the student network 20, based on a loss function calculated by comparing a learning model of the teacher network 10 and a learning model of the student network 20. That is, the architecture of the student network in accordance with the present disclosure may be changed according to the loss function calculation result. Thus, the student network may generate a learning model with performance similar to the teacher network 10, while having a smaller network configuration than the teacher network 10 and being trained at higher speed.

Figure 3:
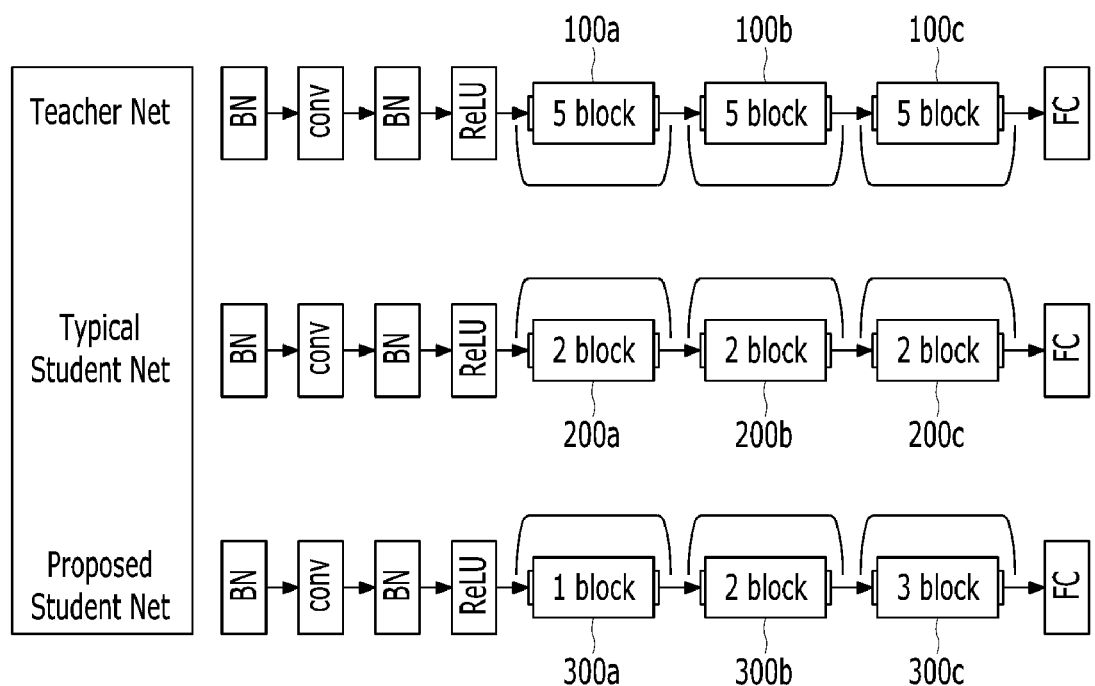
FIG. 3 is a block diagram conceptually and comparatively illustrating learning models of a teacher-student network based on knowledge distillation in accordance with an embodiment of the present disclosure.

FIG. 3 is a block diagram conceptually and comparatively illustrating learning models of a teacher-student network based on knowledge distillation in accordance with an embodiment of the present disclosure. FIG. 3 is based on the supposition that five learning blocks are allocated to each of first to third stages 100a to 100c of the teacher network 10. In the related art, the student network 20 has a smaller size than the teacher network 10. For example, each of first to third stages 200a to 200c is configured as two learning blocks each having a fixed size. However, in the learning model of the teacher-student network in accordance with the embodiment of the present disclosure, the number of learning blocks constituting each of the stages of the student network 20 is not fixed. For example, a first stage 300a of the student network 20 in accordance with the embodiment of the present disclosure may have one learning block. However, when a loss function is calculated as a large value, a second stage 300b may have two learning blocks. Furthermore, when a loss function in the second stage 300b is calculated as a large value, a third stage 300c may have three learning blocks.

Figure 4:
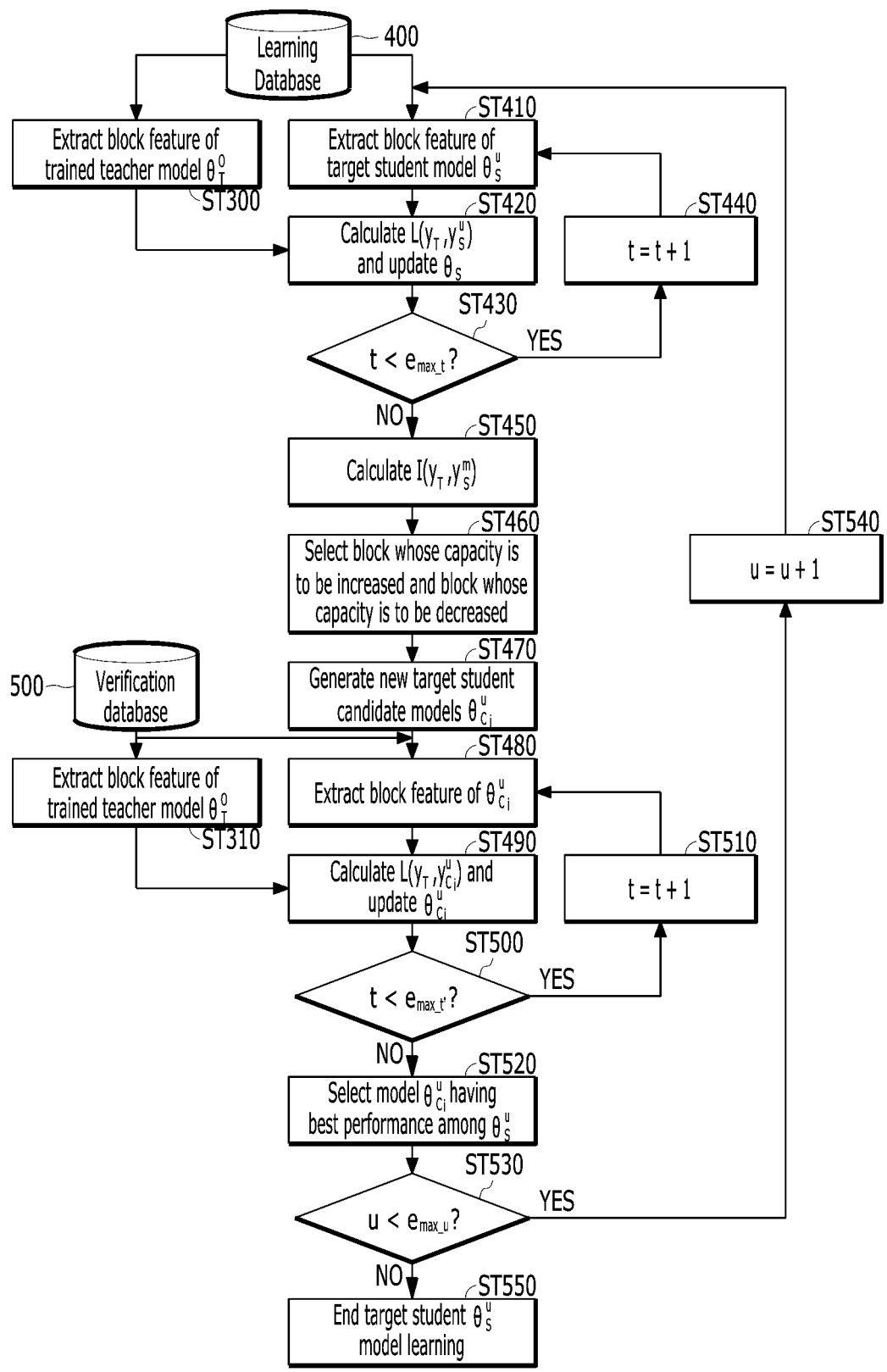
FIG. 4 is a flowchart illustrating a neural architecture search method based on knowledge distillation in accordance with an embodiment of the present disclosure.

FIG. 4 is a flowchart illustrating a neural architecture search method based on knowledge distillation in accordance with an embodiment of the present disclosure. Referring to FIG. 4, the embodiment of the present disclosure will be described in detail as follows.

First, the neural architecture search method based on knowledge distillation in accordance with the embodiment of the present disclosure may be performed by a model training device (e.g. a device that is mounted in an autonomous vehicle and configured to recognize and learn an image), or performed in a data recognition device (e.g. a device that is installed in a server and configured to recognize and learn image data received from the outside). Although not illustrated, the model training device or the data recognition device may include a communication unit, a memory and a processor.

The communication unit is a unit for receiving a learning image. For example, the communication unit may be a unit for receiving an image taken by a camera mounted on a vehicle. For another example, the communication unit may be a unit for receiving a learning image from a remote server or remotely transmitting a learning image. The image may include objects such as a surrounding vehicle, a pedestrian, a bicycle, a building, a traffic light, a lane, a sign and other obstacles.

The memory is a unit for storing a computer readable instruction for performing a process, and the processor is a unit for calling the memory to perform mechanical learning on the learning image received through the communication unit. As will be described below, the processor is a processing device that compares a model trained in the teacher network to a model trained in the student network, calculates a loss function and an implementation rate, which will be described below, and increases/decreases the capacity of each block in the student network. The processor may be implemented as a single processor or multi-processor.

Referring to FIG. 4, the neural architecture search method based on knowledge distillation in accordance with the embodiment of the present disclosure may use a learning database 400 and a verification database 500. Each of the databases is a unit for storing learning images, and may be configured as a memory unit mounted in an autonomous vehicle or constructed as a separate database server. Furthermore, the learning database 400 and the verification database 500 may be each configured as a separate database or integrated into a single database.

As typically known, the teacher network 10 receives a learning image from the learning database 400 and/or the verification database 500, and performs machine learning through a learning model thereof. In FIG. 4, $\theta_T^0$ represents a model trained in the teacher network 10. In step ST300, the teacher network 10 receives a learning image from the learning database 400, and extracts an image feature map from the trained model $\theta_T^0$. In step ST310, the teacher network 10 receives a learning image from the verification database 500, and extracts an image feature map from the trained model $\theta_T^0$. During a process of selecting a block whose capacity is to be increased and a block whose capacity is to be decreased in the student model, and generating a target student candidate model and during a process of verifying the target student candidate model and completing the architecture search, the learning process in the teacher network 10 and the feature map extraction processes in steps ST300 and ST310 need to be preceded.

Referring to FIG. 4, the neural architecture search method starts with step ST410 of extracting an image feature map from a learning model of the student network 20. Here, $\theta_S^u$ represents a learning model which is performed in a $u^{th}$ student network 20.

Figure 5:
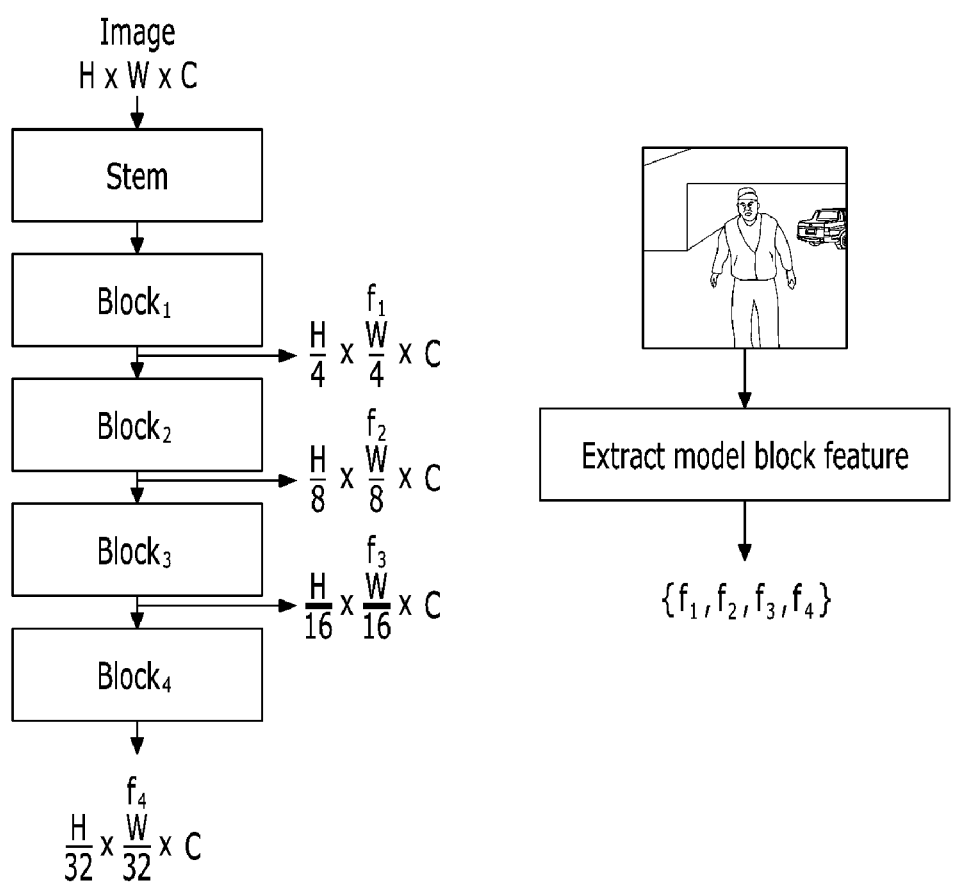
FIG. 5 is a diagram illustrating a process of extracting a block feature map from a neural network-learning model in accordance with an embodiment of the present disclosure.

FIG. 5 is a diagram illustrating a process of extracting a block feature map from a neural network-learning model in accordance with an embodiment of the present disclosure. Referring to FIG. 5, a learning image may be typically specified as five strides, i.e. Stem (½), Block1(¼), Block2 (⅛), Block3(1/16) and Block4(1/32), and have a total of four block feature maps except Stem. The block feature maps {f2, f3, f4} may be used to derive three parameters such as height H, width W and direction C, as illustrated in FIG. 5.

The process of extracting the image feature map from the learning model of the teacher network 10 in step ST300 and the process of extracting the image feature map from the learning model of the student network 20 in step ST410 may be performed as illustrated in FIG. 5.

Then, the image feature map extracted from the learning model of the teacher network 10 and the image feature map extracted from the learning model of the student network 20 are compared to calculate a loss function $L(y_T, y_S^u)$ in step ST420. Then, the model $\theta_S^u$ trained in the student network 20 is updated. Here, $y_T$ represents the image feature map of the model trained in the teacher network 10, $y_S^u$ represents the image feature map of the model trained in the student network 20, and $L(y_T, y_S^u)$ represents the loss function obtained by comparing the two feature maps.

For example, the loss function may be a first loss function obtained by comparing a loss caused by a distance difference between at least two feature points within the image feature map of the teacher-learning model to a loss caused by a distance difference between at least two feature points within the image feature map of the student-learning model.

For another example, the loss function may be a second loss function obtained by comparing a loss caused by direction differences among at least three feature points within the image feature map of the learning model in the teacher network to a loss caused by direction differences among at least three feature points within the image feature map of the learning model in the student network.

For another example, the loss function may be the sum of the first and second loss functions.

Figure 6:
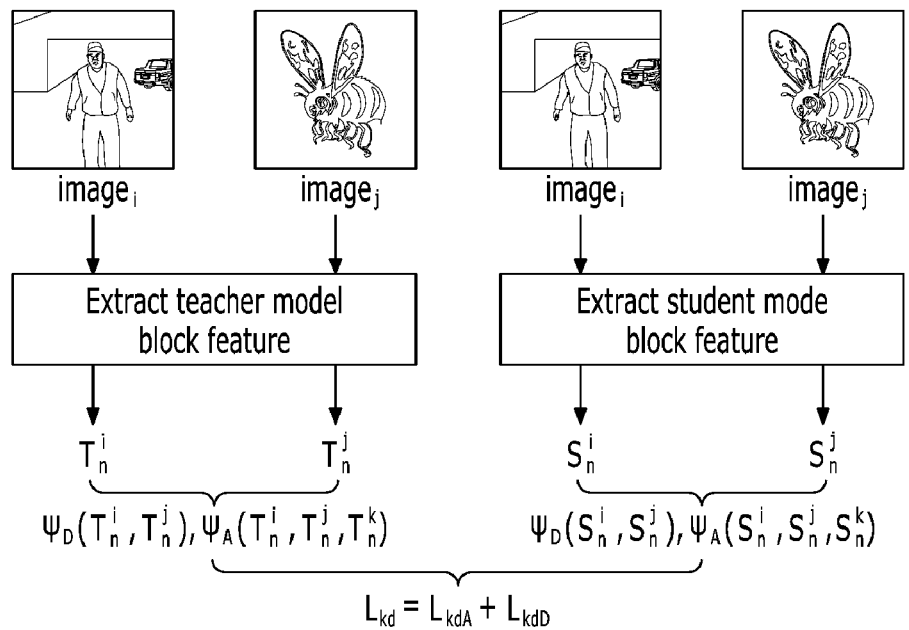
FIG. 6 is a diagram illustrating a process of calculating a loss function based on the distance and direction between a feature map of a learning model extracted from a teacher network and a feature map of a learning model extracted from a structure network in accordance with an embodiment of the present disclosure.

FIG. 6 is a diagram illustrating a process of calculating a loss function based on the distance and direction between a feature map of a learning model extracted from a teacher network and a feature map of a learning model extracted from a student network in accordance with an embodiment of the present disclosure. Referring to FIG. 6, the process of calculating a loss function will be described in detail as follows.

Referring to FIG. 6, a feature point $T_n^i$ is extracted from an $i^{th}$ image of the teacher-learning model, a feature point $T_n^j$ is extracted from a $j^{th}$ image of the teacher-learning model, a feature point $S_n^j$ is extracted from an $i^{th}$ image of the student-learning model, a feature point $S_n^j$ is extracted from a $j^{th}$ image of the student-learning model.

The loss function in step ST420 (exemplified as in FIG. 6) may be calculated as the sum of the first loss function $L_{kdD}$ and the second loss function $L_{kdA}$, wherein the first loss function $L_{kdD}$ is a value obtained by comparing a loss caused by direction differences among two feature points in the teacher-learning model to a loss caused by direction differences among two feature points in the student-learning model, and the second loss function $L_{kdA}$ is a value obtained by comparing a loss caused by a distance difference between three feature points in the teacher-learning model to a loss caused by a distance difference between three feature points in the student-learning model.

First, a loss $\Psi_D(x,y)$ for the distance difference between the two feature points in any one learning model may be calculated by Equation 1 below.

$$\Psi_D(x, y) = \frac{(x-y)^2}{X}, (x, y) \in X \quad \text{Equation 1}$$

In Equation 1, X represents the total distance of the feature maps, and (x-y) represents the distance difference between two feature points.

Next, the loss $\Psi_A(x,y,z)$ for distance differences among three feature points in any one learning model may be calculated by Equation 2 below.

$$\Psi_A(x,y,z) = \cos \angle xyz \quad \text{Equation 2}$$

Here, the direction differences among the three feature points may be calculated through Taylor series $<e^{xy}, e^{zy}>$.

The loss function $l(x,y)$ obtained by comparing the losses of the teacher-learning model and the student-learning model may be calculated by Equation 3 below, $$l(x, y) = \begin{cases} \frac{1}{2}(x-y)^2 & \text{for } |x-y| \leq 1, \\ |x-y| - \frac{1}{2} & \text{otherwise} \end{cases} \quad \text{Equation 3}$$

Here, the value of the loss function is calculated through the difference between two values (x, y). When the difference is smaller than 1, the value is calculated as "2-norm". Otherwise, the value is calculated as "1-norm". Since "1-norm" exhibits the characteristic of an extreme value, "1-norm" is used when the value is large.

Now, $L_{kdD}$ (the value obtained by comparing the loss caused by the direction differences among two feature points in the teacher-learning model to the loss caused by the direction differences among two feature points in the student-learning model) in the example of FIG. 6 may be calculated by Equation 4 below.

$$L_{kdD} = l(\Psi_D(T_n^i, T_n^j), \Psi_D(S_n^i, S_n^j)) \quad \text{Equation 4}$$

Furthermore, $L_{kdA}$ (the value obtained by comparing the loss caused by the distance difference between the three feature points in the teacher-learning model to the loss caused by the distance difference between the three feature points in the student-learning model) may be calculated by Equation 5 below.

$$L_{kdA} = l(\Psi_A(T_n^i, T_n^j, T_n^k), \Psi_A(S_n^i, S_n^j, S_n^k)) \quad \text{Equation 5}$$

Referring back to FIG. 4, it is determined whether the number t of learning processes based on knowledge distillation in the student network 20 reaches the predetermined maximum number $e_{max\_t}$ of learning processes based on knowledge distillation, in step ST430. When the number t of learning processes in the student network 20 does not reach the maximum number of learning processes, the number t is increased by one in step ST440, and the procedure returns to step ST410. In step S420, the loss function is calculated, and the learning model $\theta_S^u$ of the student network 20 is updated. When it is determined in step ST430 that the number of learning processes has reached the maximum number of learning processes, the procedure proceeds to step ST450 to calculate a block implementation rate Ii by performing a hyperbolic tangent operation on a cumulative loss function for the respective blocks of the learning model of the student network 20. The block implementation rate Ii, which is the opposite concept of the loss function, is a numerical value which is expressed as a probability indicating how similar the corresponding block of the student network 20 is to the teacher network 10.

Figure 7:
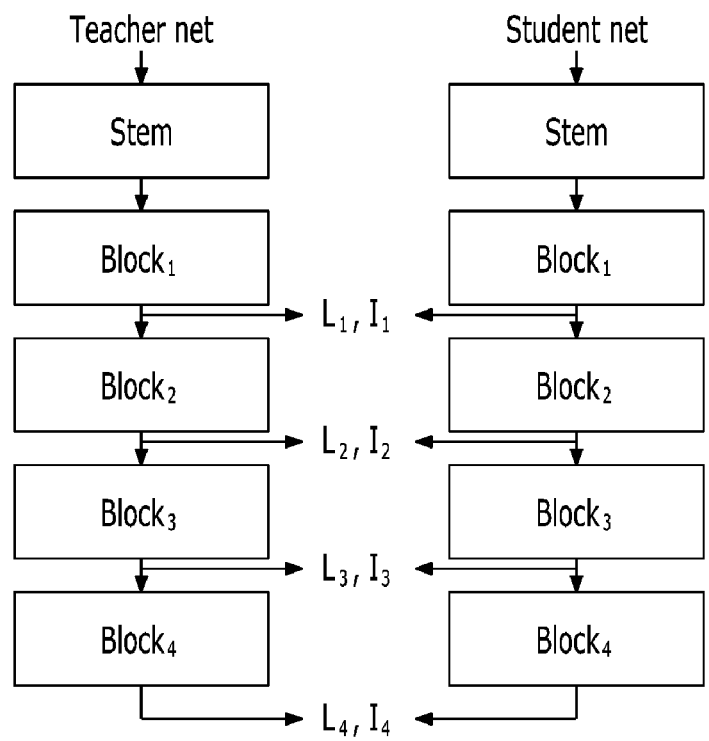
FIG. 7 is a diagram illustrating a process of converting a loss function for each block into a block implementation rate in accordance with an embodiment of the present disclosure.

FIG. 7 is a diagram illustrating a process of converting a loss function for each block into a block implementation rate in accordance with an embodiment of the present disclosure.

Referring to FIG. 7, loss functions L1 to L4 and block implementation rates I1 to I4 are calculated for four blocks, respectively.

The block implementation rates for the respective blocks may be calculated by Equation 6 below.

$$I_i = \begin{cases} 1 - \tanh(L_i) & i = 1, \\ \frac{1 - \tanh(L_i)}{1 - \tanh(L_{i-1})} & \text{otherwise} \end{cases} \quad \text{Equation (6)}$$

Since the block implementation rate needs to be estimated as a probability, the block implementation rate is obtained by converting a loss function into a probability through a hyperbolic tangent operation. Furthermore, since the losses for the respective blocks are calculated as a cumulative value, the block implementation rate is calculated as an implementation rate against the previous block, except the first block.

Now, a block whose capacity is to be increased and a block whose capacity is to be decreased are selected among the blocks of the learning model of the student network 20 based on the block implementation rate, in step ST460.

When the block implementation rate is low, it indicates that the loss function is large, and the capacity of the corresponding block needs to be increased. On the contrary, when the block implementation rate is high, it indicates that the loss function is small, and the capacity of the corresponding block may be decreased. Therefore, in step ST460, the capacities of the respective blocks are selected in order to increase the capacity of a block whose block implementation rate is smaller than a reference value, and to decrease the capacity of a block whose block implementation rate is larger than the reference value.

Through step ST460, the architecture constituting the student network 20 is reconfigured. According to the reconfigured block architecture of the student network 20, candidate learning models $\theta_{C_i}^u$ of the student network 20 are decided in step ST470. Here, the candidate learning models $\theta_{C_i}^u$ indicate new learning models derived from the learning model $\theta_S^u$ of the student network 20 by the neural architecture search method based on knowledge distillation in accordance with the embodiment of the present disclosure.

Figure 8:
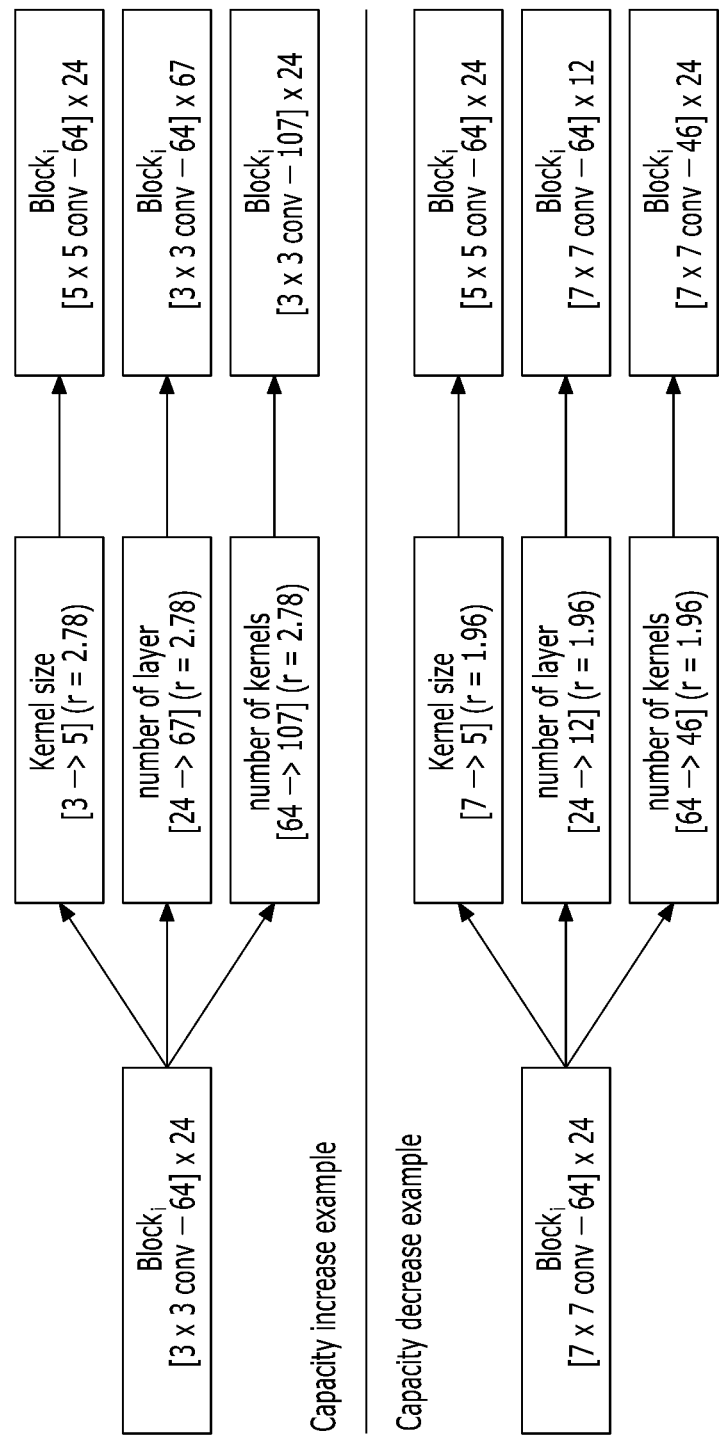
FIG. 8 is a diagram illustrating an example in which the capacity of each block is increased/decreased in accordance with an embodiment of the present disclosure.

FIG. 8 is a diagram illustrating an example in which the capacities of the respective blocks are increased/decreased in accordance with the embodiment of the present disclosure. This example shows the block architecture of the student network 20 is reconfigured. In the present disclosure, when the block capacity of the student network 20 is increased/decreased, it indicates that at least any one of the kernel size, the number of layers and the number of kernels in each of the learning model blocks is increased/decreased.

The top of FIG. 8 illustrates examples in which the capacity is increased. The respective examples show that the kernel size, the number of layers and the number of kernels are increased. The bottom of FIG. 8 illustrates examples in which the capacity is decreased. The respective examples show that the kernel size, the number of layers and the number of kernels are decreased.

In terms of the amount of calculation, the number of layers is increased in proportion to the entire amount of calculation. However, when the kernel size or the number of kernels is increased, the amount of calculation is proportional to the square root thereof.

That is, in the neural architecture search method based on knowledge distillation in accordance with the embodiment of the present disclosure, the amount of calculation in the student network 20 may be increased as illustrated in the top of FIG. 8. This method is an access method which is totally different from the neural architecture search method based on knowledge distillation according to the related art. Although a block where the amount of calculation is increased may occur, the learning model of the student network 20 may exhibit performance at a level close to the teacher network 10.

Furthermore, in the neural architecture search method based on knowledge distillation in accordance with the embodiment of the present disclosure, the amount of calculation in the student network 20 may be decreased as illustrated in the bottom of FIG. 8. The neural architecture search method may have an effect of significantly reducing the amount of calculation for a block which exhibits performance close to the teacher network 10.

The neural architecture search method based on knowledge distillation in accordance with the embodiment of the present disclosure may further include verifying the candidate learning models $\theta_{C_i}^u$ of the student network 20. Hereafter, the process will be described in detail.

Referring to FIG. 4, the procedure may proceed to step ST480 to extract an image feature map from the candidate learning models $\theta_{C_i}^u$ of the student network 20, after step ST470 is ended. The process of extracting the image feature map from the candidate learning models $\theta_{C_i}^u$ may be performed in the same manner as described above with reference to FIG. 5.

Then, the image feature map extracted from the learning model $\theta_T^0$ of the teacher network 10 in step ST310 and the image feature map extracted from the candidate learning models $\theta_{C_i}^u$ are compared to calculate a verification loss function $L(y_T, y_{C_i}^u)$ in step ST490. Then, the candidate learning models $\theta_{C_i}^u$ trained in the student network 20 are updated. Here, $y_T$ represents the image feature map of the model trained in the teacher network 10, $y_{C_i}^u$ represents the image feature map of the candidate learning models $\theta_{C_i}^u$ trained in the student network 20, and $L(y_T, y_{C_i}^u)$ represents the verification loss function obtained by comparing the two feature maps.

For example, the verification loss function may be a third loss function obtained by comparing a loss caused by a distance difference between at least two feature points within the image feature map of the teacher-learning model to a loss caused by a distance difference between at least two feature points within the image feature map of the candidate learning models $\theta_{C_i}^u$ of the student network 20.

For another example, the verification loss function may be a fourth loss function obtained by comparing a loss caused by direction differences among at least three feature points within the image feature map of the teacher learning model to a loss caused by direction differences among at least three feature points within the image feature map of the candidate learning models $\theta_{C_i}^u$ of the student network 20.

For another example, the verification loss function may be the sum of the third and fourth loss functions.

The process of calculating and updating the verification loss function for the candidate learning models $\theta_{C_i}^u$ may be performed in the same manner as described with reference to FIG. 6.

Then, it is determined whether the number t of learning processes based on knowledge distillation in the student network 20 reaches the predetermined maximum number $e_{max\_t'}$ of verification learning processes based on knowledge distillation, in step ST500. The maximum number $e_{max\_t'}$ of verification learning processes does not need to be equal to the maximum number $e_{max\_t}$ of learning processes, described in step ST430.

When the number t of learning processes in the student network 20 does not reach the maximum number $e_{max\_t'}$ of verification learning processes, the number t is increased by one in step ST5100, and the procedure returns to step ST480. Then, the procedure proceeds to step ST490 to repeat the process of calculating the verification loss function and updating the candidate learning models $\theta_{C_i}^u$. When it is determined in step ST500 that the number t of learning processes in the student network 20 has reached the maximum number $e_{max\_t'}$ of verification learning processes, the procedure proceeds to step ST520 to select, as a final learning model $\theta_S^u$, a learning model having the smallest verification loss function and the best performance, among the candidate learning models $\theta_{C_i}^u$, in step S520.

Then, it is determined whether a neural architecture search count u reaches the maximum count $e_{max\_u}$, in step S530. When the neural architecture search count u does not reach the maximum count $e_{max\_u}$, the neural architecture search count is increased in step ST540, and the procedure returns to step ST410. When it is determined in step ST530 that the neural architecture search count u has reached the maximum count $e_{max\_u}$, the training of the student-learning model, i.e. the neural architecture search is ended in step S550.

While various embodiments have been described above, it will be understood to those skilled in the art that the embodiments described are by way of example only. Accordingly, the disclosure described herein should not be limited based on the described embodiments.

What is claimed is:

1. A neural architecture search method based on knowledge distillation, which is performed by a model training device that is mounted in an autonomous vehicle and configured to recognize and learn an image or a data recognition device that is installed in a server and configured to recognize and learn image data received from the outside; and trains a student network using knowledge acquired from a teacher network and searches a target neural network, wherein the model training device and the data recognition device each include a communication unit; a memory; and a processor,
    wherein a step performed by the processor comprises:
    (a) extracting an image feature map from a learning model of the student network;
    (b) calculating a loss function by comparing an image feature map extracted from a learning model of the teacher network to the image feature map extracted in the step (a), updating a learning model of the student network until the number of learning processes in the student network reaches the predetermined maximum number of learning processes based on knowledge distillation, and calculating a block implementation rate by performing a hyperbolic tangent operation on a cumulative loss function for each block of the learning model of the student network;
    (c) selecting a block whose capacity is to be increased and a block whose capacity is to be decreased, for each learning model block of the student network, wherein a block whose block implementation rate is smaller than a reference value is increased, and a block whose block implementation rate is larger than the reference value is decreased; and (d) deciding a candidate learning model of the student network according to the block architecture selected in the step (c).

2. The neural architecture search method of claim 1, wherein the loss function of the step (b) comprises a first loss function obtained by comparing a loss caused by a distance difference between at least two feature points within the image feature map of the teacher-learning model to a loss caused by a distance difference between at least two feature points within the image feature map of the student-learning model.

3. The neural architecture search method of claim 1, wherein the loss function of the step (b) comprises a second loss function obtained by comparing a loss caused by direction differences between at least three feature points within the image feature map of the teacher-learning model to a loss caused by a direction differences between at least three feature points within the image feature map of the student-learning model.

4. The neural architecture search method of claim 1, wherein the loss function of the step (b) comprises the sum of a first loss function obtained by comparing a loss caused by a distance difference between at least two feature points within the image feature map of the teacher-learning model to a loss caused by a distance difference between at least two feature points within the image feature map of the student-learning model and a second loss function obtained by comparing a loss caused by direction differences between at least three feature points within the image feature map of the teacher-learning model to a loss caused by a direction differences between at least three feature points within the image feature map of the student-learning model.

5. The neural architecture search method of claim 1, wherein the capacity of the step (c) comprises at least any one of the kernel size, the number of layers and the number of kernels in each of the blocks of the learning model of the student network.

6. The neural architecture search method of claim 1, further comprising the step (e) of verifying the candidate learning model of the student network, selected in the step (d).

7. The neural architecture search method of claim 6, wherein the step (e) comprises:
(e-1) extracting an image feature map from the candidate learning model,
(e-2) calculating a verification loss function by comparing the image feature map extracted from the learn g model of the teacher network to the image feature map of the candidate learning model extracted in the step (e-1); and (e-3) selecting, as a final learning model, a learning model having the smallest verification loss function, among the candidate learning models.

8. The neural architecture search method of claim 7, wherein the verification loss function of the step (e-2) comprises a third loss function obtained by comparing a loss caused by a distance difference between at least two feature points within the image feature map of the teacher-learning model to a loss caused by a distance difference between at least two feature points within the image feature map of the candidate learning model.

9. The neural architecture search method of claim 7, wherein the verification loss function of the step (e-2) comprises a fourth loss function obtained by comparing a loss caused by direction differences between at least three feature points within the image feature map of the teacher-learning model to a loss caused by direction differences between at least three feature points within the image feature map of the candidate learning model.

10. The neural architecture search method of claim 7, wherein the verification loss function of the step (e-2) comprises the sum of a third loss function obtained by comparing a loss caused by a distance difference between at least two feature points within the image feature map of the teacher-learning model to a loss caused by a distance difference between at least two feature points within the image feature map of the candidate learning model and a fourth loss function obtained by comparing a loss caused by direction differences between at least three feature points within the image feature map of the teacher-learning model to a loss caused by direction differences between at least three feature points within the image feature map of the candidate learning model.

11. The neural architecture search method of claim 7, wherein the verification loss function of the step (e-2) is repeatedly updated until the number of learning processes in the student network reaches the predetermined maximum number of verification learning processes based on knowledge distillation.

12. The neural architecture search method of claim 7, further comprising the step of determining whether a neural architecture search count reaches the maximum count, after the step (e-3), wherein (i) when the neural architecture search count does not reach the maximum count, the neural architecture search count is increased, and the procedure returns to the step (a), and (ii) when the neural architecture search count has reached the maximum count, the neural architecture search is ended.

* * * * *